United States Patent [19]

Gerber

[11] 4,028,167

[45] June 7, 1977

[54] LABEL APPLICATOR FOR AUTOMATICALLY CONTROLLED CUTTING MACHINE

[75] Inventor: Heinz Joseph Gerber, West Hartford, Conn.

[73] Assignee: Gerber Garment Technology, Inc., East Hartford, Conn.

[22] Filed: July 29, 1976

[21] Appl. No.: 709,901

[52] U.S. Cl. .............................. 156/384; 156/510; 156/536

[51] Int. Cl.$^2$ ........................................ B32B 31/00

[58] Field of Search .......... 156/384, 510, 511, 536, 156/556, 563

[56] References Cited

UNITED STATES PATENTS

| | | | |
|---|---|---|---|
| 3,582,433 | 6/1971 | Rothenberger | 156/384 |
| R28,732 | 3/1976 | von Hofe | 156/384 |

*Primary Examiner*—Douglas J. Drummond
*Attorney, Agent, or Firm*—McCormick, Paulding & Huber

[57] ABSTRACT

An automatically controlled cutting machine has a label applicator mounted with the cutting tool for movement above the support surface of a table on which multi-ply layups of sheet material are positioned for cutting. Stacks of pattern pieces cut from the layup by the tool are marked with information labels dispensed from the applicator. Information borne by the labels is preprinted on the labels or is generated by a printer which cooperates with the dispensing mechanism of the applicator.

7 Claims, 6 Drawing Figures

LABEL APPLICATOR FOR AUTOMATICALLY CONTROLLED CUTTING MACHINE

BACKGROUND OF THE INVENTION

The present invention relates to automatically controlled cutting equipment of the type used to generate multiple pattern pieces from a layup of sheet material. More particularly, the present invention is concerned with a labeling apparatus which is utilized in conjunction with the cutting machine to apply information labels to stacks of pattern pieces as they are cut in the layup.

It is well known to cut multiple pattern pieces of the same size and shape from a layup of sheet material. A cutting machine suitable for this purpose is disclosed in U.S. Pat. No. 3,495,492 entitled *Apparatus for Working on Sheet Material* and having the same assignee as the present invention. In this machine, a vacuum table is employed to hold a layup in position as a reciprocating cutting blade is lowered into cutting engagement with the sheet material and translated along a line of cut defining the periphery of a pattern piece. After the periphery has been completely circumscribed by the cutting blade, a stack of similarly shaped pieces is left on the table separated from the rest of the layup. The stack of cut pattern pieces is eventually removed from the cutting table in loose form or the pieces may be tied or joined together as a bundle by apparatus such as disclosed in U.S. Pat. No. 3,765,349 entitled *Apparatus for Forming Bundles of Sheet Material* and also having the same assignee as the present invention.

The bundles of pattern pieces are generally removed from the cutting room and taken to a sewing room where various pieces are assembled as wearing apparel, upholstery, or other finished products. It will be understood that unless the individual bundles of pattern pieces are marked in some manner, the only means of identifying the pieces is their individual shapes. Recognition of certain pattern pieces would be difficult especially when only slight differences exist between similar pieces for articles of different sizes. For this and other reasons, it has been a practice in the past to mark the bundles of pattern pieces in the cutting room while the pieces are still on the cutting table, and such marking has been done by means of pens or other writing instruments attached to the tool carriage of the cutting machine. The same automatic controller which generates the commands for moving the cutting tool relative to the sheet material in a cutting operation also provides the commands for moving the writing instrument relative to a sheet material in a marking operation.

The type of information which is desirable on each bundle of pattern pieces is quite varied and changes from time to time even though the shape of a pattern piece remains the same. For example, in addition to size, style and other information, it is desirable to indicate routing of the pattern pieces through various manufacturing stages. All of this information is difficult to apply with writing instruments attached to the tool carriage of the machine due to the relatively large scale at which such machines are designed to operate. Such information, can however, be provided in a printed label or tag. The label may have several different sections which are separated by perforations to permit portions of the label to be removed from the bundled pattern pieces for record keeping purposes.

It is, accordingly, a general object of the present invention to provide apparatus which applies information labels to stacks of sheet material cut from a multiplied layup. It is also an object of the present invention to provide a printer which cooperates with the applying apparatus to generate printed information on the labels before they are applied to the sheet material.

SUMMARY OF THE INVENTION

The present invention resides in a label applicator which is used with an automatically controlled cutting machine. The cutting machine has a cutting tool and a support table which move relative to one another while the tool is in cutting engagement with a layup of sheet material spread on the table. The relative movements are controlled to cause the tool to follow a cutting path defining the periphery of pattern pieces desired from the layup.

A label applicator is mounted with the cutting tool for movement above the support surface of the table and relative to the sheet material spread thereon. The applicator includes dispensing means for applying information labels individually to the exposed surface of the sheet material within the peripheries of the pattern pieces which are cut. The application of the labels to the sheet material may occur either before or after the pattern pieces have been cut by the tool.

A printer, such as an electrostatic printer, may also be mounted with the cutting tool and cooperates with the label applicator in generating information on the labels peculiar to the pattern pieces to which the labels are applied.

The label applicator and the printer may operate in response to the same automatic controller which operates the cutting tool. Thus, a coordinated cutting and labeling operation can be carried out on the same layup.

DESCRIPTION OF THE PREFERRED EMBODIMENTS

Figure 1:
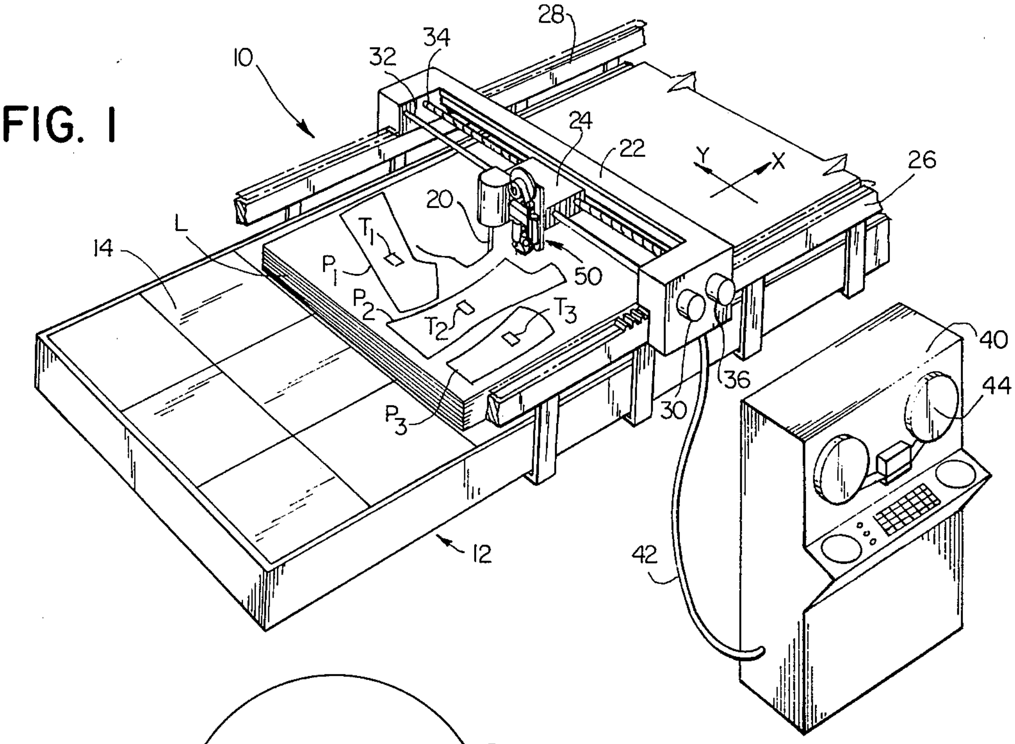
FIG. 1 is a perspective view of an automatically controlled cutting machine including the label applicator of the present invention.

FIG. 1 illustrates in a perspective view an automatically controlled cutting machine, generally designated 10, which is utilized to cut a plurality of similarly shaped pattern pieces $P_1$ and $P_2$, etc. from a layup L of limp sheet material. The limp sheet material forming the layup L may be a woven or nonwoven fabric, plastic, paper, cardboard, leather or other material and the pattern pieces which are cut from the sheet material may be used for a variety of products such as garments, shoes, upholstery and the like.

The cutting machine 10 illustrated is of the type which employs a vacuum table 12 to hold the sheet material in place as the cutting operation is carried out. In general the table has a penetrable bed which may be formed by a plurality of bristled mats having the free ends of the bristles in a generally common plane defining a support surface 14. A vacuum or low pressure region is generated in the bed to draw the sheet material forming the layup into a compressed mass against the support surface. For a more complete description of the table, reference may be had to U.S. Pat. No. 3,495,492 mentioned above.

A cutting tool 20 is suspended above the support surface 14 and the layup L by a pair of carriages 22 and 24 which move relative to the table 12 in the illustrated X and Y directions. The cutting tool 20 is preferably a reciprocating cutting blade that is lowered from the carriage 24 into cutting engagement with the layup at the beginning of the cutting operation to reciprocate along its own axis in cutting engagement with the sheet material. The carriages 22 and 24 translate the knife along a cutting path defined by the periphery of the pattern pieces desired from the layup. The reciprocating cutting blade is also rotated about its own axis in order to be oriented generally tangent to the line of cut at each point. When a cutting operation is complete, the tool 20 is lifted out of engagement with the sheet material.

The carriage 22 is designated the X-carriage due to its movement in the X-coordinate direction over the table 12 on a pair of gear racks 26,28. The racks are engaged by pinions (not shown) in the X-carriage and the pinions are driven by an X-drive motor 30.

The carriage 24 is referred to as the Y-carriage due to its movement in the Y-coordinate direction and is suspended from the X-carriage by means of a guide bar 32 and a lead screw 34 threadably engaged with the carriage 24. The lead screw 34 is rotated by means of the Y-drive motor 36 and thus the cutting tool 20 can be translated by the motors 30 and 36 over any portion of the support surface 14 through the combined motions of the carriages 22 and 24.

Command signals controlling the drive motors 30 and 36, and, correspondingly, the positions of the carriages and cutting tool, are transmitted to the cutting machine 10 from an automatic controller 40 through a control cable 42. The controller 40 is preferably a numerical controller which operates from a program tape 44 defining the profile or peripheries of the pattern pieces to be cut from the layup. Since numerical control of multi-axis machines is well known in the art, a more detailed description of the controller 40 is not provided.

In accordance with the present invention, a label applicator generally designated 50, is attached to the Y-carriage 24 adjacent the cutting tool 20. The applicator 50 moves with the tool over the layup L and includes dispensing means for applying information labels $T_1$ and $T_2$, etc. individually to the exposed surface of the sheet material within the peripheries of pattern pieces $P_1$ and $P_2$, etc. respectively. The labels T are applied to the upper ply of the stack of pattern pieces which may be a cover sheet specially laid on top of the sheet material for this or other purposes. For example, a sheet of air-impermeable material such as polyethylene is sometimes positioned over the layup in order to more firmly compress the layup when a vacuum is drawn by the table 12. In such case, the labels may be pasted directly on the air-impermeable sheet. If a special sheet is not used or desired, the labels can be applied directly to the upper ply by means of an adhesive which is releasable or capable of being removed from the sheet material without destroying its color or shape, or the labels may be attached by a stapling or threading apparatus such as shown in U.S. Pat. No. 3,765,349 referenced above.

Each of the labels T is provided with printed information peculiar to the pattern pieces to which the label is attached. The information may be pre-printed on the labels before they are installed in the applicator, or the information may be generated on the labels by a printer in response to commands from the controller 40 as the labels are dispensed from the applicator 50.

Figure 5:
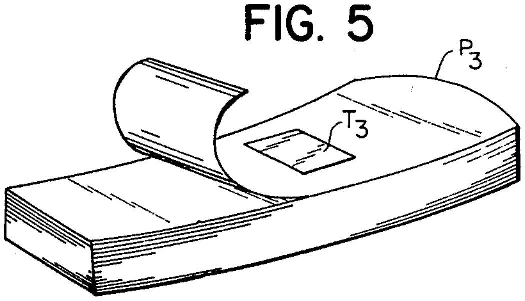
FIG. 5 is a perspective view of a stack of pattern pieces bearing a printed label from the applicator of the present invention.

FIG. 5 illustrates a bundle of pattern pieces after removal from the support surface of the cutting table. The bundle carries with it a label which provides identifying or routing information for subsequent handling of the bundle. If the upper ply of the bundle is expendable, such ply with the label may be removed when convenient or desired.

Figure 6:
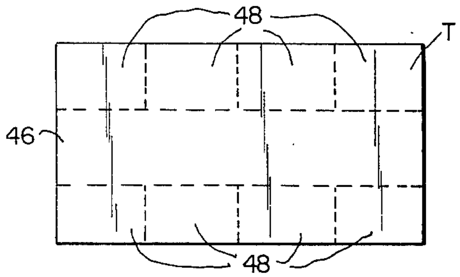
FIG. 6 is a plan view showing a perforated label that may be dispensed and applied by the present invention.

FIG. 6 illustrates a perforated label T that may be applied to the sheet material by means of an adhesive or other means engaging a central attaching portion 46 of the label. Individual perforated sections 48 are located along opposite sides of the attaching portion and may be torn from the attaching portion for record keeping purposes, for example, by personnel in the sewing room.

Figure 2:
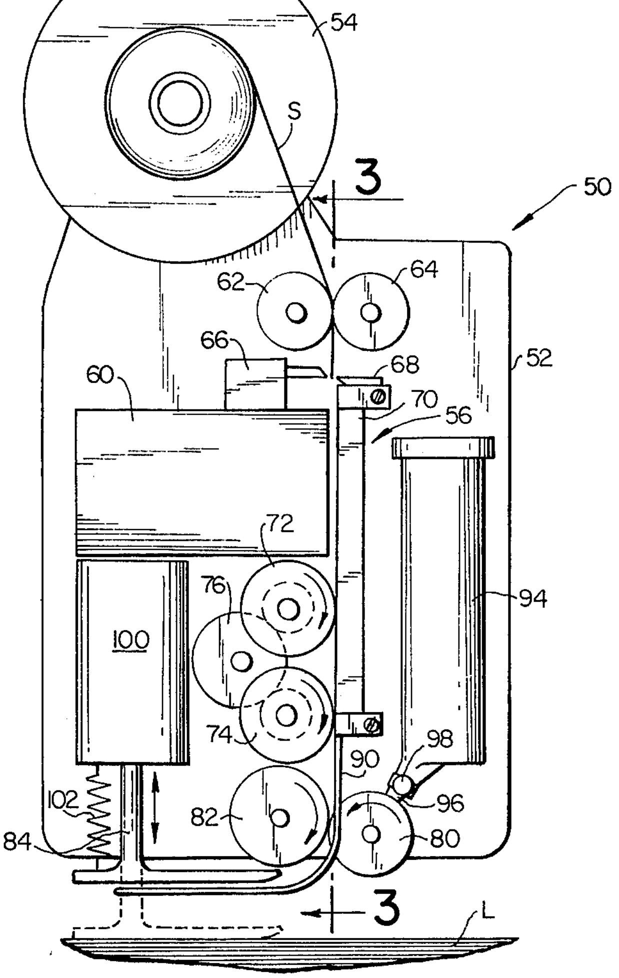
FIG. 2 is a front elevation view of the label applicator shown on the cutting machine of FIG. 1.
Figure 3:
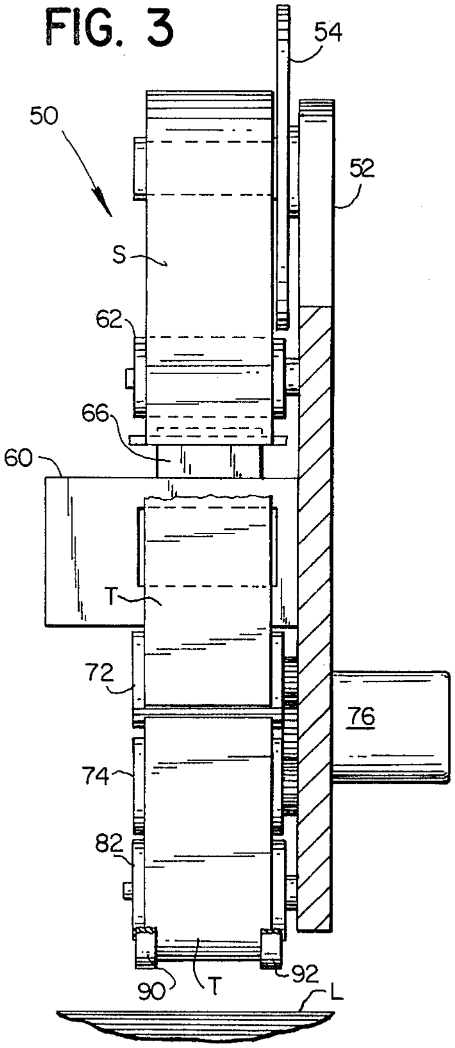
FIG. 3 is a side elevation view of the label applicator as seen along the sectioning line 3—3 of FIG. 2.
Figure 4:
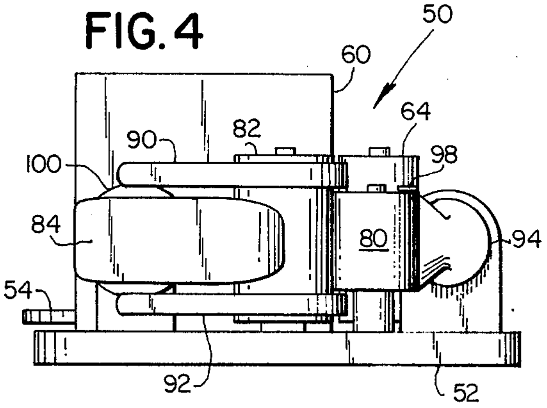
FIG. 4 is a bottom plan view of the label applicator in FIG. 2.

FIGS. 2, 3 and 4 illustrate one embodiment of the label applicator 50 in detail. The principal components of the applicator are supported on a mounting board 52 which is adjustably positionable along a vertical axis on the Y-carriage of the cutting machine for layups of different stack heights. The applicator includes dispensing means comprised of a storage spool 54 on which a series of interconnected labels or label material is wound as a strip S and a feed mechanism 56 for advancing individual labels from the strip adjacent a printer 60 and onto the exposed upper surface of the layup L immediately below the applicator. In general, the strip S of labels is pulled from the storage spool 54 by means of two feed rollers 62 and 64 pressing against opposite sides of the strip. From the rollers 62 and 64 the strip passes a solenoid-actuated shearing knife 66 which cooperates with a counter blade 68 to cut the strip after one segment of the strip or a single label is situated between the printer 60 and a backing plate 70 fixedly secured to the mounting board 52. An individual label severed from the strip S advances downwardly between the backing plate and a pair of pressure rollers 72 and 74 driven by a motor 76 in the direction indicated by the arrows. A gumming or pasting roller 80 and cooperating feed roller 82 shift the label under a reciprocating tamper 84. When the applicator 50 has been positioned over a selected pattern piece by the carriages 22 and 24, the tamper is actuated from its solid-line to phantom position shown in FIG. 2 and presses the label against the upper ply of the layup L.

The distance from the feed rollers 62 and 64 to the roller 72 is selected to be less than the length of a label cut off by the shearing knife 66 so that one end or the other of the label will be engaged with the feed mechanism at all times. The backing plate 70 is made from a polished plate to insure that the label slides freely over the plate in engagement with the feed wheels 72 and 74. The distance from the feed roller 74 to the rollers 80 and 82 is also selected to be less than the length of a label, again to insure that a severed label is always engaged with the feed mechanism. The drive motor 76 for the rollers 72 and 74 may also be connected with the rollers 62,64 80 and 82 by appropriate gearing or belt mechanism to insure synchronous operation, and each of the rollers other than the gumming roller 80 may bear a rubber sleeve or coating to improve engagement with the label.

As a severed label passes the lower end of the backing plate 70, it follows a pair of curved and parallel guide bars 90 and 92 which straddle the gumming roller 80 as shown most clearly in FIG. 4. The guide bars insure that the label is directed under the reciprocating tamper 84 before it is discharged onto the layup L. The strip S and correspondingly the label cut from the strip is substantially wider than the gumming roller 80 and overlies the guide bars 90 and 92 as shown in FIGS. 3 and 4. Thus, the gumming roller 80 makes contact only with a central portion of the label and applies an adhesive to a limited area along the one side of the label. The tamper 84 is also straddled by the guide bars 90 and 92, and therefore, presses the label portion bearing the adhesive against the layup. Thus, only the central portion of the label is secured to the layup by means of the adhesive; however, such attachment is adequate for the intended information function served by the label.

To maintain a constant supply of adhesive on the gumming roller 80, a reservoir 94 having a wiper 96 contacting the roller 80 is attached to the mounting board 52. A shut-off valve 98 is included adjacent the wiper and may be solenoid-actuated to terminate the flow of adhesive during periods when the applicator 50 is not operated.

The tamper 84 is suspended from an operating solenoid 100 which provides the motive force for driving the tamper downwardly between the guide bars 90 and 92 to the phantom position when the label is situated under the tamper prior to attachment to the layup L. If the solenoid 100 is a single-acting solenoid which extends the tamper, a return spring 102 is connected between the tamper and the solenoid to retract the tamper and insure that the tamper is held in its uppermost position in the event of a power failure. Thus, the tamper 84 and solenoid 100 are fail-safe.

It will be understood that the indexing and cutting of individual labels in the applicator 50 is coordinated with the operation of the tamper 84 by the controller 40. For example, as one label is positioned under the tamper 84 in its elevated position, another label is positioned adjacent the printer 60 and severed from the strip S by the shearing knife 66. The operation of the tamper 84 is delayed until the gummed label is positioned under the tamper and the entire applicator 50 is positioned over the pattern piece to which the gummed label is to be attached. It should also be understood that the application of the label to the pattern pieces may be formed either before or after the pattern pieces are cut in the layup.

The individual labels which are initially part of the strip S may bear preprinted information prior to installation in the applicator 50 in which case the printer 60 is not needed. In a preferred embodiment of the invention, however, the labels are not preprinted and the printer 60 is a controlled electrostatic printer connected with and responsive to signals from the automatic controller 40 in FIG. 1. Such a printer generates printed information on the labels as the cutting and labeling operation is carried out in accordance with commands in the program of the tape 44.

Accordingly, the cutting machine 10 is provided with a label applicator 50 for attaching information labels to pattern pieces cut from layups supported on the cutting table 12. The applicator may be operated with preprinted labels or may include a printer which generates printed information on the individual labels as they are applied.

While the present invention has been described in a preferred embodiment, it should be understood that numerous modifications and substitutions can be had without departing from the spirit of the invention. For example, the shearing knife and the tamper solenoids may be replaced by pneumatic or other actuating mechanisms. If the strip in which the labels are stored is pre-gummed with an adhesive that merely requires a wetting agent to become tacky, the gumming roller 80 may merely apply the wetting agent from the reservoir 94. The labels may also be stored on the carriage 24 in precut form rather than in the strip S provided that an appropriate dispenser is provided for feeding the labels individually to the tamper 84 and in front of a printer, if utilized. The labels may also be attached to the layup by means other than an adhesive such as a stapling or threading device. Accordingly, the present invention has been described in a preferred embodiment by way of illustration rather than limitation.

I claim:

1. In combination in an automatically controlled cutting machine having a cutting tool and a support table which move relative to one another in a cutting operation to cut pattern pieces from sheet material spread on the support surface of the table, the improvement comprising:

a label applicator mounted with the cutting tool for movement above the support surface of the table relative to the sheet material spread on the table, the applicator including dispensing means for applying information labels individually to the exposed surface of the sheet material within the periphery of the pattern pieces cut from the material.

2. In combination in an automatically controlled cutting machine, the improvement of claim 1 further including a printer mounted with the cutting tool above the support surface of the table and cooperating with the label applicator to impose information on the labels peculiar to the pattern pieces to which the labels are applied by the dispensing means.

3. In combination with a cutting machine having an automatic control defining the pattern pieces to be cut, the improvement of claim 2 wherein the printer is a controlled printer connected with the automatic control and responsive to signals from the control to establish the printed information imposed upon the individual labels.

4. The improvement of claim 3 wherein the controlled printer is an electrostatic printer.

5. In combination with an automatic cutting machine, the improvement of claim 1 wherein the applicator further includes means for storing a plurality of the labels to be attached by the dispensing means to the sheet material, the storing means being mounted with the cutting tool for movement relative to the table.

6. In combination with an automatic cutting machine, the improvement of claim 5 wherein the dispensing means is connected with and cooperates with the storing means to remove the labels from the storing means and apply the labels to the sheet material individually.

7. Apparatus for preparing labelled stacks of pattern pieces comprising:

a support table having a surface suitable for carrying a layup of sheet material during a cutting operation;

a movable carriage mounted above the support surface of the table and movable over sheet material positioned on the surface;

a cutting tool mounted on the carriage for movement with carriage over the sheet material and adjustable relative to the support surface of the table for positioning in and out of cutting engagement with the material; and label applicating means also mounted on the movable carriage for movement over the sheet material on the support surface for dispensing information labels onto the sheet material cut by the tool.

* * * * *